(12) United States Patent
Zhu et al.

(10) Patent No.: US 12,269,952 B2
(45) Date of Patent: Apr. 8, 2025

(54) FULLY BIO-BASED, HIGHLY FILLED LIGNIN-RUBBER MASTERBATCH, METHOD FOR PREPARING SAME, AND USE THEREOF

(71) Applicant: NANJING TECH UNIVERSITY, Nanjing (CN)

(72) Inventors: Chenjie Zhu, Nanjing (CN); Haifeng Liu, Nanjing (CN); Ming Li, Nanjing (CN); Lei Ji, Nanjing (CN); Zhiwei Chang, Nanjing (CN); Yixin Feng, Nanjing (CN); Zhuotao Tan, Nanjing (CN); Tao Shen, Nanjing (CN); Hanjie Ying, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 0 days.

(21) Appl. No.: 18/807,918

(22) Filed: Aug. 17, 2024

(65) Prior Publication Data

US 2024/0409745 A1    Dec. 12, 2024

(30) Foreign Application Priority Data

Dec. 25, 2023   (CN) .......................... 202311790137.7

(51) Int. Cl.
| | |
|---|---|
| C08L 97/00 | (2006.01) |
| C08J 3/12 | (2006.01) |
| C08J 3/22 | (2006.01) |
| C08K 5/09 | (2006.01) |
| C08L 7/00 | (2006.01) |

(52) U.S. Cl.
CPC ............... *C08L 97/005* (2013.01); *C08J 3/12* (2013.01); *C08J 3/22* (2013.01); *C08K 5/09* (2013.01); *C08L 7/00* (2013.01); *C08J 2307/00* (2013.01); *C08J 2397/00* (2013.01)

(58) Field of Classification Search
CPC ... C08L 97/005; C08L 7/00; C08J 3/12; C08J 3/22; C08J 2307/00; C08J 2397/00; C08K 5/09

See application file for complete search history.

(56) References Cited

U.S. PATENT DOCUMENTS

| | | | |
|---|---|---|---|
| 2010/0204368 A1* | 8/2010 | Benko | .................. C08L 97/005 530/502 |
| 2015/0232497 A1 | 8/2015 | Pietarinen et al. | |
| 2020/0048438 A1 | 2/2020 | Kawamoto | |
| 2023/0135725 A1 | 5/2023 | Zhu et al. | |

FOREIGN PATENT DOCUMENTS

| | | | | |
|---|---|---|---|---|
| CN | 110914341 A | 3/2020 | | |
| CN | 111836821 A | 10/2020 | | |
| WO | WO-2021142079 A1 * | 7/2021 | ............. | C08G 63/08 |
| WO | WO-2023106989 A1 * | 6/2023 | | |

OTHER PUBLICATIONS

Liu, Li-Yang, A Simple Route to Synthesize Esterified Lignin Derivatives, 2019, Green Chemistry, 21, 3682-3692. (Year: 2019).*
Zhao, Xiaohong, Esterification mechanis of lignin with different catalysts based on lignin model compounds by mechanical activation-assisted solid-phase synthesis, 2017, RSC Advances, 7, 52382-52390. (Year: 2017).*
An, Liangliang, Efficient and Green Approach for the Esterification of Lignin with Oleic Acid Using Surfactant-combined Microreactors with Water, 2020, BioResources, 15, 1, 89-104 (Year: 2020).*

* cited by examiner

*Primary Examiner* — Robert S Jones, Jr.
*Assistant Examiner* — Joshua Caleb Bledsoe
(74) *Attorney, Agent, or Firm* — CBM PATENT CONSULTING, LLC

(57) ABSTRACT

The present invention discloses a fully bio-based, highly filled lignin-rubber masterbatch, a method for preparing same, and use thereof. The lignin-rubber masterbatch is prepared by a method comprising: (1) reacting a lignin, acetic acid, and oleic acid in the presence of a catalyst to give a modified lignin; and (2) blending the modified lignin and a rubber, and granulating to give the lignin-rubber masterbatch. The highly filled lignin-rubber masterbatch prepared by the present invention can replace the conventional reinforcing agent carbon black and provide a better reinforcing effect and higher mechanical properties for rubber materials. The present invention can also reduce the rubber content of the rubber composite materials while retaining the mechanical properties, thus featuring cost-efficiency.

9 Claims, 2 Drawing Sheets

Example 1     Example 2     Example 3

Comparative Example 1     Comparative Example 2

FULLY BIO-BASED, HIGHLY FILLED LIGNIN-RUBBER MASTERBATCH, METHOD FOR PREPARING SAME, AND USE THEREOF

CROSS-REFERENCE TO RELATED APPLICATIONS

This application claims priority to Chinese Patent Application Ser. No. CN202311790137.7 filed on 25 Dec. 2023.

TECHNICAL FIELD

The present invention relates to the fields of rubber filling and modification and biomass resource recycling and comprehensive utilization, and in particular, to a fully bio-based, highly filled lignin-rubber masterbatch, a method for preparing same, and use thereof in replacing carbon black in rubbers.

BACKGROUND

Lignins, a group of natural aromatic polymers extracted from plants with a three-dimensional network structure, are biological macromolecules consisting of three phenylpropane derivative units connected by ether bonds and carbon-carbon bonds. Lignins contain enriched active groups such as aromatic rings, aliphatic and aromatic hydroxyl groups, quinone groups, and the like, and are mainly present in the secondary wall of plant cells. As a green renewable resource, lignins have the advantages of diverse sources, low density, high biological efficiency, broad ecological adaptability, and the like. Industrial lignins mainly come from black liquors in papermaking and residues in the biorefinery industry, which, if not utilized, will become waste and seriously pollute the environment.

Most macromolecular polymers such as plastics, rubbers, etc., may require fillers to improve their performance and cost-efficiency. Carbon black is widely used as a reinforcing filler in the rubber industry, but people are more and more concerned by the toxicity and impacts of carbon black on health and the environment. More researchers turn their attention to a green and renewable biomass resource-lignins for replacing carbon black as a filler in rubber. Lignins possess characteristics of good mechanical performance, biodegradability, excellent thermal stability, and the like, and are prospective as a reinforcing filler to replace carbon black in rubber. However, lignins feature a high polarity due to a large amount of aliphatic and aromatic hydroxyl groups, which provide a poor compatibility for lignins as a filler with commonly used non-polar rubber, such as natural rubber, styrene butadiene rubber, cis-polybutadiene rubber, and ethylene propylene rubber, in daily lives. Also, the strong interaction between hydroxyl groups in lignin molecules easily causes aggregation in a rubber matrix, resulting in poor dispersibility and thus reduced mechanical performance, rheological properties and thermal stability in products.

In order to solve such problems, lignins are usually modified chemically to improve their compatibility and dispersibility in the rubber matrix, or by adding a compatibilizer to enhance the interfacial adhesion between lignins and the rubber matrix. The reduction in the aliphatic and aromatic hydroxyl group content in the lignin molecules and thus reduced polarity are the keys of lignin chemical modification. By comparing some common methods for lignin chemical modification, it can be seen that some methods usually introduce some short-chain acetic anhydride in a large quantity to reduce the content of hydroxyl groups in lignins and thus improve the hydrophobicity of lignins, which, however, do not significantly improve the compatibility between lignins and the material matrix. Some other methods usually introduce some long-chain aliphatic compounds, which, when excessively introduced, will lead to over-crosslinking of the lignin molecules, and most of such modified lignins possess higher Tg and Tm that greatly challenge the subsequent processing process.

Therefore, the present invention proposes a fully bio-based, highly filled lignin-rubber masterbatch, and a method for preparing same, and use thereof to effectively solve the technical problems.

SUMMARY

Objective: The present invention is intended to provide a fully bio-based, highly filled lignin-rubber masterbatch, so as to solve the technical problem in the prior art.

The present invention is also intended to provide a method for preparing a fully bio-based, highly filled lignin-rubber masterbatch.

The present invention is further intended to provide use of a fully bio-based, highly filled lignin-rubber masterbatch.

Spirit: The present invention provides a novel crosslinking control method for preparing modified lignins, where a modified lignin is obtained by the esterification reaction of a lignin, a certain proportion of end-capping reagent acetic acid, and long-chain fatty acid oleic acid, and the modified lignin and a rubber are mixed and granulated to give a fully bio-based, highly filled lignin-rubber masterbatch;

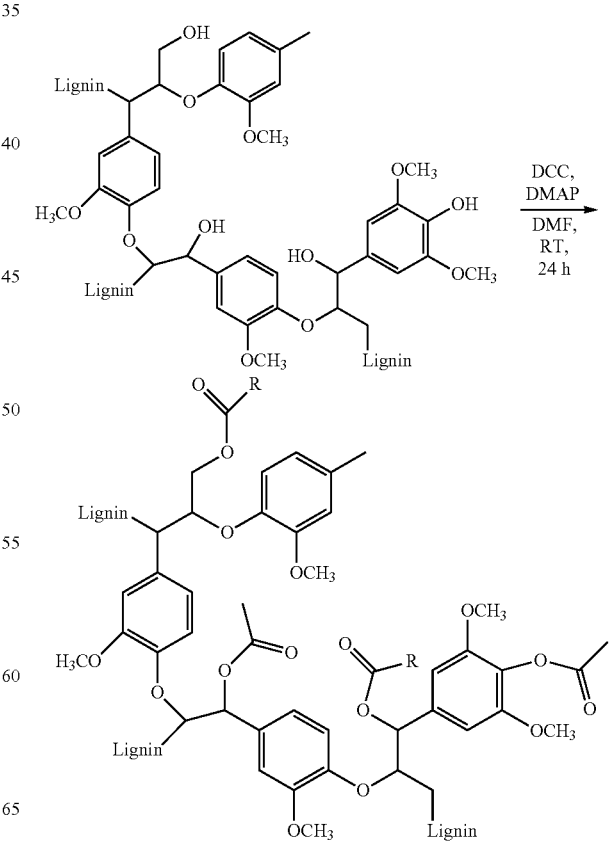

R = 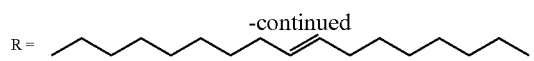
-continued

Specifically, a modified lignin with high hydrophobicity, controllable crosslinking degree, and low Tg is prepared by adjusting the proportion of end-capping reagent acetic acid and long-chain fatty acid oleic acid. The Tg and Tm of the lignin and the polarity of the lignin are reduced by introducing a certain amount of renewable long-chain fatty acid oleic acid, thus improving the compatibility between the lignin and a natural rubber and providing excellent processing performance. Moreover, the addition of end-capping reagent acetic acid in a certain proportion reduces the number of excessive reaction sites, hydroxyl groups, in the lignin, which further reduces the polarity of the lignin and is beneficial to its dispersion in rubber. The obtained modified lignin is then blended with a rubber in an open mill or an internal mixer, and finally, the blend is granulated on a twin-screw extruder to prepare the fully bio-based, highly filled lignin-rubber masterbatch. The method has the advantages of ease of operation, cost-efficiency, renewable raw materials, and the like.

In order to solve the technical problems described above, the present invention discloses the following technical solutions:

In a first aspect, the present invention discloses a lignin-rubber masterbatch prepared by a method comprising:
  adding a mixture of a dry lignin, acetic acid, and oleic acid into a solvent, uniformly mixing, and reacting in the presence of a catalyst to give a modified lignin; and
  blending the modified lignin and a rubber, and granulating on a twin-screw extruder to give the fully bio-based, highly filled lignin-rubber masterbatch.

In a second aspect, the present invention discloses a method for preparing a lignin-rubber masterbatch, comprising:
  adding a mixture of a dry lignin, acetic acid, and oleic acid into a solvent, uniformly mixing, and reacting in the presence of a catalyst to give a modified lignin; and
  blending the modified lignin and a rubber, and granulating on a twin-screw extruder to give the fully bio-based, highly filled lignin-rubber masterbatch.

In the first and second aspects described above,
  in step (1), the lignin is any one of alkali lignin, kraft lignin, lignosulfonate, enzymatically digested lignin, and organosolv lignin.

In step (1), the mass-to-mole ratio of the lignin to the total amount of acetic acid and oleic acid is 1 g:8.2-18.2 mol, preferably 1 g:10.2-16.2 mol, and more preferably 1 g:12.2-14.2 mol; preferably, the molar ratio of acetic acid to oleic acid is 1:0.5-3, preferably 1:1-2.5, and more preferably 1:1.5-2.

In step (1), the catalyst is any one of N,N-dicyclohexylcarbodiimide (DCC) and 4-dimethylaminopyridine (DMAP), or a combination thereof; preferably, the mass-to-mole ratio of the lignin to the catalyst is 1 g:5.7-11.2 mmol, preferably 1 g:6.7-10.2 mmol, and more preferably 1 g:7.7-9.2 mmol; preferably, the catalyst is a combination of N,N-dicyclohexylcarbodiimide and 4-dimethylaminopyridine; preferably, the order for adding the catalyst during the reaction is to add DCC firstly and to slowly add a solution of DMAP in dimethylformamide (DMF); preferably, the molar ratio of N,N-dicyclohexylcarbodiimide to 4-dimethylaminopyridine is 2-4:1, preferably 2.5-3.5:1, and more preferably 3:1.

In step (1), the solvent of the reaction is an organic solvent, preferably N,N-dimethylformamide (DMF); preferably, the mass-to-volume ratio of the lignin to the solvent is 1 g:11-23 mL, preferably 1 g:14-21 mL, and more preferably 1 g:16-19 mL.

In step (1), the temperature of the reaction is 20-30° C.; the time of the reaction is 40-56 h, preferably 48 h.

In step (1), after the reaction is completed, a reaction solution containing the modified lignin is obtained, and the reaction solution is filtered to remove a by-product DCU to give a black liquid; the black liquid is added to an aqueous HCl solution to precipitate a solid, and the solid is filtered and dried to give the modified lignin, wherein the drying includes but is not limited to vacuum drying; preferably, the drying is vacuum drying, and the temperature is 40-70° C.; preferably, the modified lignin is milled, preferably by jet milling.

In step (2), the modified lignin accounts for 10%-90%, preferably 40%-85%, and more preferably 70%-80% of the total mass of the modified lignin and the rubber.

In step (2), the rubber comprises one or more of styrene butadiene rubber, cis-polybutadiene rubber, natural rubber, ethylene propylene rubber, ethylene propylene diene monomer rubber, and butyl rubber.

In step (2), the blending is conducted in an open mill or an internal mixer; preferably, the temperature of the blending is 60-120° C.

In a third aspect, the present invention discloses use of the lignin-rubber masterbatch according to the first aspect above or a lignin-rubber masterbatch prepared by the method according to the second aspect above in preparing a rubber composite material, comprising:
  mixing the lignin-rubber masterbatch with a rubber to give a rubber compound; and
  subjecting the rubber compound obtained in step (i) and an additive, such as a vulcanizing agent, a vulcanizing additive, a vulcanizing accelerant, etc., to mixing, milling, and compression molding to give the rubber composite material.

In step (i), the rubber comprises one or more of styrene butadiene rubber, cis-polybutadiene rubber, natural rubber, ethylene propylene rubber, ethylene propylene diene monomer rubber, and butyl rubber.

In step (i), the mass ratio of the lignin-rubber masterbatch to the rubber is 1.6-3.6:1, preferably 2.6:1.

In step (i), the mixing is conducted at 80-145° C. for 15-30 min, preferably at 100° C. for 15 min.

In step (ii), the vulcanizing agent is selected from any one of sulfur, 1,1-bis(tert-butylperoxy)-3,3,5-trimethylcyclohexane, dicumyl peroxide, and benzoyl peroxide, or a combination of two or more.

In step (ii), the vulcanizing additive is selected from any one of zinc oxide, stearic acid, naphthenic oil, benzothiazole disulfide, tetramethylthiuram disulfide, and N-cyclohexyl-2-benzothiazole sulfenamide, or a combination of two or more.

In step (ii), the vulcanizing accelerant includes a polyethylene glycol, such as PEG-4000.

In step (ii), the mass ratio of the natural rubber to the vulcanizing agent and the vulcanizing additive is 1:0.005-0.25:0.1-0.3, preferably 1:0.1:0.2.

In step (ii), the mixing comprises mixing in an open mill, milling, and compression molding; the mixing is conducted at 10-35° C. for 5-15 min, preferably at 20° C. for 10 min; the milling is conducted 3-5 times; the compression molding is conducted on a plate vulcanizing press at 130-180° C. for 10-40 min, preferably at 160° C. for 20 min.

Beneficial Effects:

The lignin, acetic acid, and oleic acid in the method are renewable resources with diverse sources, thus reducing the consumption of non-renewable resources and facilitating sustainable development; the present invention features a simple production process, and the prepared filler can significantly improve the mechanical properties of rubber, thus providing good economic benefit.

The polar hydroxyl content in the modified lignin is greatly reduced, which results in a lignin grafted with hydrophobic long-chain fatty acid with greatly reduced polarity and glass transition temperature and improved compatibility with natural rubber that is favorable for the dispersion of the lignin in a rubber matrix. The obtained highly filled lignin-rubber masterbatch features a very high surface hydrophobicity, leading to smooth surfaces of the products.

The highly filled lignin-rubber masterbatch prepared by the present invention can replace the conventional reinforcing agent carbon black and provide a better reinforcing effect and higher mechanical properties for rubber materials. The present invention can also reduce the rubber content of the rubber composite materials while retaining the mechanical properties, thus featuring cost-efficiency.

The highly filled lignin-rubber masterbatch prepared by the present invention is applicable to existing natural rubber systems, and is also applicable to various non-polar rubbers such as styrene butadiene rubber, cis-polybutadiene rubber and ethylene propylene diene monomer rubber, or a rubber combination matrix of two or more.

BRIEF DESCRIPTION OF THE DRAWINGS

The present invention will be further illustrated in detail with reference to the following accompanying drawing and detailed description, from which the advantages in the above and/or other aspects of the present invention will become more apparent.

DETAILED DESCRIPTION

Figure 1:
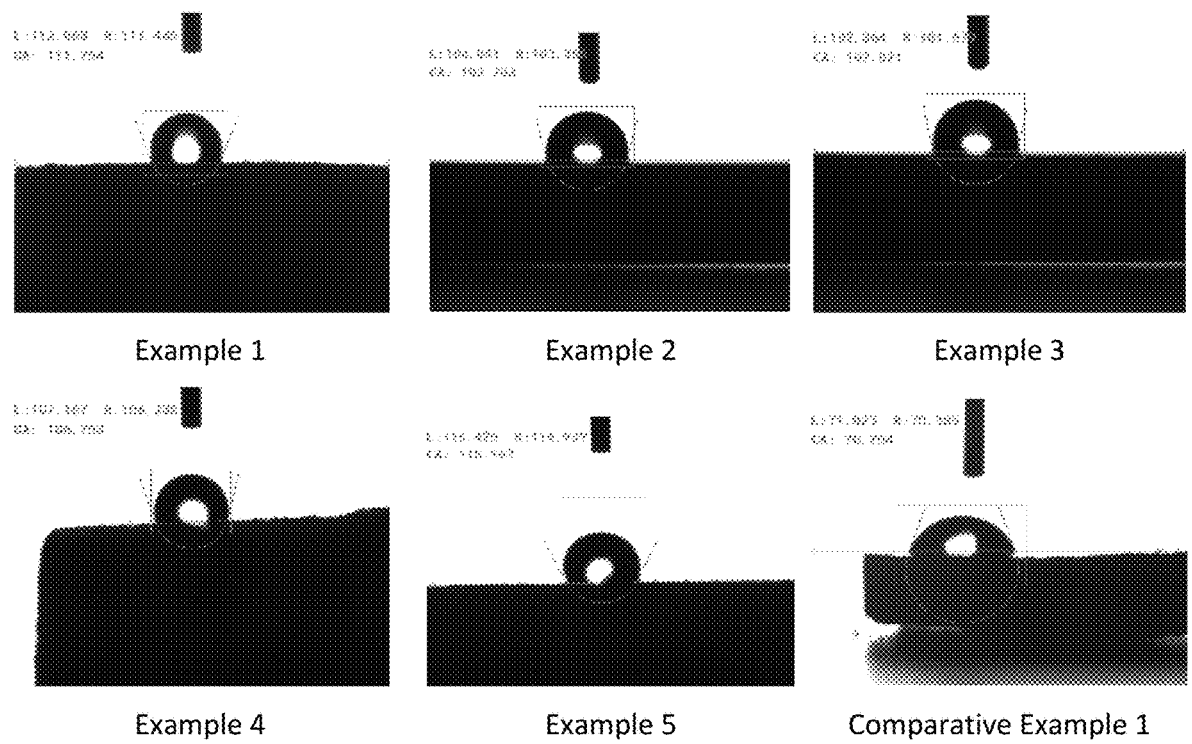
FIG. 1 illustrates the water contact angles of the modified lignins obtained in Example 1, Comparative Example 1 and Comparative Example 2.

In the following examples, the experimental methods are all conventional methods unless otherwise specified; the reagents and materials are commercially available, unless otherwise specified.

In the following examples, the lignin is alkali lignin, unless otherwise specified.

Example 1

The lignin and a mixture of acetic acid and oleic acid (in a molar ratio of 1:2) were added to 360 mL of DMF in a mass-to-mole ratio of 20 g:284 mol. The mixture was stirred at room temperature for 20 min until complete dissolution. N,N-dicyclohexylcarbodiimide (DCC, 28.4 g, 137.6 mmol) was then added to the reaction system. The system was degassed with nitrogen for 5 min. 4-Dimethylaminopyridine (DMAP, 5.6 g, 45.8 mmol) was added to 15 mL of DMF, and the mixture was then slowly added to the reaction system. The reaction system was stirred at room temperature for 48 h and filtered to remove by-product ethyl N,N-dichlorocarbamate (DCU) to give a black filtrate. The black filtrate was added to an aqueous HCl solution to give a precipitate. The precipitate was separated by filtration to give a brown filter cake, and the brown filter cake was dried in vacuum at 50° C. for 24 h to give modified lignin 1 (85% yield);

The modified lignin obtained in step (1) was milled by a jet mill to a d50 of about 2 μm;

The natural rubber was masticated and banded in an open mill. 300 parts of the modified lignin filler were added as per 100 parts of the natural rubber by mass for blending. The mixing temperature was 100° C., the mixture was mixed until a constant weight to give a modified lignin 1\natural rubber masterbatch (300:100). The mixed masterbatch was granulated in a screw extruder to give the fully bio-based, highly filled lignin 1\natural rubber masterbatch.

According to the formulation in Table 1, the fully bio-based, highly filled lignin\natural rubber masterbatch obtained in step (3) was mixed with the natural rubber to give a rubber compound, wherein the mixing temperature was 100° C., and the time was 15 min. The obtained rubber compound was added into the open mill for banding, before naphthenic oil, sulfur, stearic acid, and PEG-4000 were added. The mixture was mixed at 25° C. for 10 min, milled 5 times, and subjected to compression molding on a plate vulcanizing press at 160° C. for 20 min to give the natural rubber composite material.

TABLE 1

Formulation of natural rubber composite material in Example 1

| | Component | Ratio |
|---|---|---|
| 1 | Natural rubber | 25.0% |
| 2 | Fully bio-based, highly filled lignin 1\natural rubber masterbatch | 65.0% |
| 3 | Naphthenic oil | 4.0% |
| 4 | Stearic acid | 1.0% |
| 5 | Sulfur | 2.5% |
| 6 | PEG-4000 | 2.5% |

Example 2

The lignin and a mixture of acetic acid and oleic acid (in a molar ratio of 1:1) were added to 300 mL of DMF in a mass-to-mole ratio of 20 g:284 mol. The mixture was stirred at room temperature until complete dissolution. N,N-dicyclohexylcarbodiimide (DCC, 117 mmol) was then added to the reaction system. The system was degassed with nitrogen for 5 min. 4-Dimethylaminopyridine (DMAP, 36.5 mmol) was added to 15 mL of DMF, and the mixture was then slowly added to the reaction system. The reaction system was stirred at room temperature for 48 h and filtered to remove by-product ethyl N,N-dichlorocarbamate (DCU) to give a black filtrate. The black filtrate was added to an aqueous HCl solution to give a precipitate. The precipitate was separated by filtration to give a brown filter cake, and the brown filter cake was dried in vacuum at 50° C. for 24 h to give modified lignin 2;

The modified lignin obtained in step (1) was milled by a jet mill to a d50 of about 2 μm;

The natural rubber was masticated and banded in an open mill. 300 parts of the modified lignin filler were added as per 100 parts of the natural rubber by mass for blending. The mixing temperature was 100° C., the mixture was mixed until a constant weight to give a modified lignin 2\natural rubber masterbatch (300:100). The mixed masterbatch was granulated in a screw extruder to give the fully bio-based, highly filled lignin 2\natural rubber masterbatch.

According to the formulation in Table 2, the fully bio-based, highly filled lignin 2\natural rubber masterbatch obtained in step (3) was mixed with the natural rubber to give a rubber compound, wherein the mixing temperature was 100° C., and the time was 15 min. The obtained rubber compound was added into the open mill for banding, before naphthenic oil, sulfur, stearic acid, and PEG-4000 were added. The mixture was mixed at 25° C. for 10 min, milled 5 times, and subjected to compression molding on a plate vulcanizing press at 160° C. for 20 min to give the natural rubber composite material.

TABLE 2

Formulation of natural rubber composite material in Example 2

| | Component | Ratio |
|---|---|---|
| 1 | Natural rubber | 25.0% |
| 2 | Fully bio-based, highly filled lignin 2\natural rubber masterbatch | 65.0% |
| 3 | Naphthenic oil | 4.0% |
| 4 | Stearic acid | 1.0% |
| 5 | Sulfur | 2.5% |
| 6 | PEG-4000 | 2.5% |

Example 3

The lignin and a mixture of acetic acid and oleic acid (in a molar ratio of 2:1) were added to 300 mL of DMF in a mass-to-mole ratio of 20 g:284 mol. The mixture was stirred at room temperature until complete dissolution. N,N-dicyclohexylcarbodiimide (DCC, 117 mmol) was then added to the reaction system. The system was degassed with nitrogen for 5 min. 4-Dimethylaminopyridine (DMAP, 36.5 mmol) was added to 15 mL of DMF, and the mixture was then slowly added to the reaction system. The reaction system was stirred at room temperature for 48 h and filtered to remove by-product ethyl N,N-dichlorocarbamate (DCU) to give a black filtrate. The black filtrate was added to an aqueous HCl solution to give a precipitate. The precipitate was separated by filtration to give a brown filter cake, and the brown filter cake was dried in vacuum at 50° C. for 24 h to give modified lignin 3;

The modified lignin obtained in step (1) was milled by a jet mill to a d50 of about 2 μm;

The natural rubber was masticated and banded in an open mill. 300 parts of the modified lignin filler were added as per 100 parts of the natural rubber by mass for blending. The mixing temperature was 100° C., the mixture was mixed until a constant weight to give a modified lignin 3\natural rubber masterbatch (300:100). The mixed masterbatch was granulated in a screw extruder to give the fully bio-based, highly filled lignin 3\natural rubber masterbatch.

According to the formulation in Table 3, the fully bio-based, highly filled lignin \natural rubber masterbatch obtained in step (3) was mixed with the natural rubber to give a rubber compound, wherein the mixing temperature was 100° C., and the time was 15 min. The obtained rubber compound was added into the open mill for banding, before naphthenic oil, sulfur, stearic acid, and PEG-4000 were added. The mixture was mixed at 25° C. for 10 min, milled 5 times, and subjected to compression molding on a plate vulcanizing press at 160° C. for 20 min to give the natural rubber composite material.

TABLE 3

Formulation of natural rubber composite material in Example 3

| | Component | Ratio |
|---|---|---|
| 1 | Natural rubber | 25.0% |
| 2 | Fully bio-based, highly filled lignin 3\natural rubber masterbatch | 65.0% |
| 3 | Naphthenic oil | 4.0% |
| 4 | Stearic acid | 1.0% |
| 5 | Sulfur | 2.5% |
| 6 | PEG-4000 | 2.5% |

Example 4

An enzymatically digested lignin and a mixture of acetic acid and oleic acid (in a molar ratio of 1:2) were added to 360 mL of DMF in a mass-to-mole ratio of 20 g:284 mol. The mixture was stirred at room temperature for 20 min until complete dissolution. N,N'-dicyclohexylcarbodiimide (DCC, 28.4 g, 137.6 mmol) was then added to the reaction system. The system was degassed with nitrogen for 5 min. 4-Dimethylaminopyridine (DMAP, 5.6 g, 45.8 mmol) was added to 15 mL of DMF, and the mixture was then slowly added to the reaction system. The reaction system was stirred at room temperature for 48 h and filtered to remove by-product ethyl N,N-dichlorocarbamate (DCU) to give a black filtrate. The black filtrate was added to an aqueous HCl solution to give a precipitate. The precipitate was separated by filtration to give a brown filter cake, and the brown filter cake was dried in vacuum at 50° C. for 24 h to give modified lignin 4;

The modified lignin obtained in step (1) was milled by a jet mill to a d50 of about 2 μm;

The natural rubber was masticated and banded in an open mill. 300 parts of the modified lignin filler were added as per 100 parts of the natural rubber by mass for blending. The mixing temperature was 100° C., the mixture was mixed until a constant weight to give a modified lignin 4\natural rubber masterbatch (300:100). The mixed masterbatch was granulated in a screw extruder to give the fully bio-based, highly filled lignin 4\natural rubber masterbatch.

According to the formulation in Table 4, the fully bio-based, highly filled lignin 4\natural rubber masterbatch obtained in step (3) was mixed with the natural rubber to give a rubber compound, wherein the mixing temperature was 100° C., and the time was 15 min. The obtained rubber compound was added into the open mill for banding, before naphthenic oil, sulfur, stearic acid, and PEG-4000 were added. The mixture was mixed at 25° C. for 10 min, milled 5 times, and subjected to compression molding on a plate vulcanizing press at 160° C. for 20 min to give the natural rubber composite material.

TABLE 4

Formulation of natural rubber composite material in Example 4

| | Component | Ratio |
|---|---|---|
| 1 | Natural rubber | 25.0% |
| 2 | Fully bio-based, highly filled lignin 4\natural rubber masterbatch | 65.0% |
| 3 | Naphthenic oil | 4.0% |
| 4 | Stearic acid | 1.0% |
| 5 | Sulfur | 2.5% |
| 6 | PEG-4000 | 2.5% |

Example 5

An organosolv lignin and a mixture of acetic acid and oleic acid (in a molar ratio of 1:1.5) were added to 300 mL of DMF in a mass-to-mole ratio of 20 g:244 mol. The mixture was stirred at room temperature until complete dissolution. N,N-dicyclohexylcarbodiimide (DCC, 117 mmol) was then added to the reaction system. The system was degassed with nitrogen for 5 min. 4-Dimethylaminopyridine (DMAP, 36.5 mmol) was added to 15 mL of DMF, and the mixture was then slowly added to the reaction system. The reaction system was stirred at room temperature for 48 h and filtered to remove by-product ethyl N,N-dichlorocarbamate (DCU) to give a black filtrate. The black filtrate was added to an aqueous HCl solution to give a precipitate. The precipitate was separated by filtration to give a brown filter cake, and the brown filter cake was dried in vacuum at 50° C. for 24 h to give modified lignin 5;

The modified lignin obtained in step (1) was milled by a jet mill to a d50 of about 2 μm;

The natural rubber was masticated and banded in an open mill. 300 parts of the modified lignin filler were added as per 100 parts of the natural rubber by mass for blending. The mixing temperature was 100° C., the mixture was mixed until a constant weight to give a modified lignin 5\natural rubber masterbatch (300:100). The mixed masterbatch was granulated in a screw extruder to give the fully bio-based, highly filled lignin 5\natural rubber masterbatch.

According to the formulation in Table 5, the fully bio-based, highly filled lignin 5\natural rubber masterbatch obtained in step (3) was mixed with the natural rubber to give a rubber compound, wherein the mixing temperature was 100° C., and the time was 15 min. The obtained rubber compound was added into the open mill for banding, before naphthenic oil, sulfur, stearic acid, and PEG-4000 were added. The mixture was mixed at 25° C. for 10 min, milled 5 times, and subjected to compression molding on a plate vulcanizing press at 160° C. for 20 min to give the natural rubber composite material.

TABLE 5

Formulation of natural rubber composite material in Example 5

| | Component | Ratio |
|---|---|---|
| 1 | Natural rubber | 25.0% |
| 2 | Fully bio-based, highly filled lignin 5\natural rubber masterbatch | 65.0% |
| 3 | Naphthenic oil | 4.0% |
| 4 | Stearic acid | 1.0% |
| 5 | Sulfur | 2.5% |
| 6 | PEG-4000 | 2.5% |

Comparative Example 1

A dry original lignin was milled by a jet mill to a d50 of about 2 μm for later use;

The natural rubber was masticated and banded in an open mill. 300 parts of the original lignin filler were added as per 100 parts of the natural rubber for blending. The mixing temperature was 100° C., the mixture was mixed until a constant weight to give an original lignin\natural rubber masterbatch (300:100). The mixed masterbatch was granulated in a screw extruder to give the original lignin\natural rubber masterbatch.

According to the formulation in Table 6, the original lignin \natural rubber masterbatch obtained in step (2) was mixed with the natural rubber to give a rubber compound, wherein the mixing temperature was 100° C., and the time was 15 min. The obtained rubber compound was added into the open mill for banding, before naphthenic oil, sulfur, stearic acid, and PEG-4000 were added. The mixture was mixed at 25° C. for 10 min, milled 5 times, and subjected to compression molding on a plate vulcanizing press at 160° C. for 20 min to give the natural rubber composite material.

TABLE 6

Formulation of natural rubber composite material in Comparative Example 1

| | Component | Ratio |
|---|---|---|
| 1 | Natural rubber | 25.0% |
| 2 | Original lignin/natural rubber masterbatch | 65.0% |
| 3 | Naphthenic oil | 4.0% |
| 4 | Stearic acid | 1.0% |
| 5 | Sulfur | 2.5% |
| 6 | PEG-4000 | 2.5% |

Comparative Example 2

The natural rubber was masticated and banded in an open mill. 300 parts of a carbon black filler were added as per 100 parts of the natural rubber for blending. The mixing temperature was 100° C., the mixture was mixed until a constant weight to give a carbon black\natural rubber masterbatch (300:100). The mixed masterbatch was granulated in a screw extruder to give the carbon black \natural rubber masterbatch.

According to the formulation in Table 7, the carbon black\natural rubber masterbatch obtained in step (1) was mixed with the natural rubber to give a rubber compound, wherein the mixing temperature was 100° C., and the time was 15 min. The obtained rubber compound was added into the open mill for banding, before naphthenic oil, sulfur, stearic acid, and PEG-4000 were added. The mixture was mixed at 25° C. for 10 min, milled 5 times, and subjected to compression molding on a plate vulcanizing press at 160° C. for 20 min to give the natural rubber composite material.

TABLE 7

Formulation of natural rubber composite material in Comparative Example 2

| | Component | Ratio |
|---|---|---|
| 1 | Natural rubber | 25.0% |
| 2 | Carbon black/natural rubber masterbatch | 65.0% |
| 3 | Naphthenic oil | 4.0% |
| 4 | Stearic acid | 1.0% |
| 5 | Sulfur | 2.5% |
| 6 | PEG-4000 | 2.5% |

Tests of the Examples and Comparative Examples

Contact angle test: The modified lignins and the original lignin were tested for the contact angle on a contact angle tester SDC-200. The results are shown in Table 8 and FIG. 1.

DSC test: The modified lignins and the original lignin were tested for the glass transition temperature (Tg) on a differential scanning calorimeter DZ-DSC300. The results are shown in Table 9.

Figure 2:
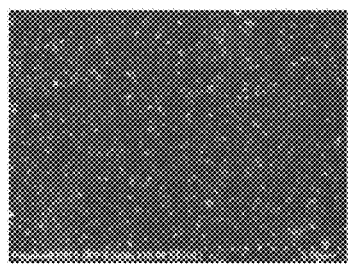
FIG. 2 illustrates the SEM photographs of the rubber masterbatches obtained in Example 1, Comparative Example 1 and Comparative Example 2.
Figure 2:
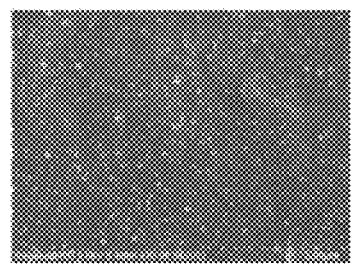
Figure 2:
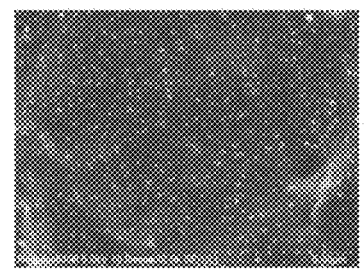
Figure 2:
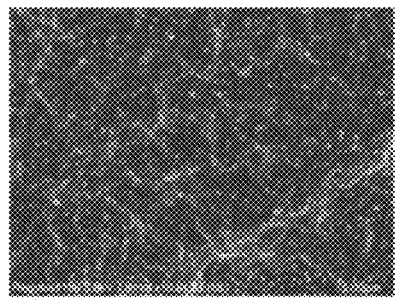
Figure 2:
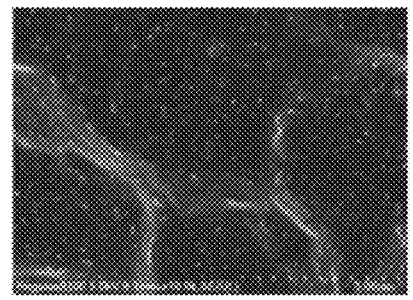

SEM test: The morphology of the rubber composite material was characterized on a Hitachi S4800 scanning electron microscope at an accelerating voltage of 20 kV. The results are shown in FIG. 2.

Tensile test: The stress at a given elongation, tensile strength, elongation at break, and Shore-A hardness of the vulcanized rubbers were respectively determined according to national standards GB/T 528-2009, GB/T 528-1998, GB/T 531-1999, and GB/T 3512-2001, and the mechanical properties were tested on a UTM6104 electronic universal tester. The mechanical properties are shown in Table 10.

TABLE 8

Contact angles of lignin and modified lignins in Examples 1-5 and Comparative Example 1

|  | Modified lignin 1 | Modified lignin 2 | Modified lignin 3 | Modified lignin 4 | Modified lignin 5 | Original lignin |
|---|---|---|---|---|---|---|
| Contact angle | 111° | 103° | 102° | 106° | 115° | 70° |

TABLE 9

Tg of lignin and modified lignins in Examples 1-5 and Comparative Example 1

|  | Modified lignin 1 | Modified lignin 2 | Modified lignin 3 | Modified lignin 4 | Modified lignin 5 | Original lignin |
|---|---|---|---|---|---|---|
| Tg | 30.2° C. | 58.5° C. | 91.4° C. | 32.5° C. | 28.6° C. | 153° C. |

TABLE 10

Mechanical properties of rubber composite materials of Examples 1-5 and Comparative Examples 1 and 2

|  | Example 1 | Example 2 | Example 3 | Example 4 | Example 5 | Comparative Example 1 | Comparative Example 2 |
|---|---|---|---|---|---|---|---|
| Tensile Strength (MPa) | 26.53 | 24.42 | 23.56 | 23.94 | 25.43 | 20.87 | 23.48 |
| Elongation at break | 479.52 | 461.25 | 452.25 | 466.3 | 470.25 | 408.26 | 452.82 |
| Stress at 100% elongation (MPa) | 2.31 | 2.26 | 2.21 | 1.99 | 2.41 | 2.05 | 2.25 |
| Stress at 300% elongation (MPa) | 13.13 | 12.07 | 12.54 | 13.12 | 13.13 | 12.42 | 12.54 |
| Permanent tensile deformation | 13.08 | 12.21 | 11.96 | 12.51 | 12.16 | 10.21 | 11.17 |
| Hardness (Shore A) | 64 | 60 | 61 | 62 | 64 | 55 | 59 |

The test results show that: from the contact angles of the original lignins and the modified lignins in Examples 1, 2 and 3 and Comparative Examples 1 and 2, the contact angles of the modified lignins were significantly increased compared with those of the original lignins, suggesting a greatly improved hydrophobicity and a better dispersibility in rubbers. Also, by comparing the glass transition temperatures of the modified lignins and the original lignins, the glass transition temperatures of the modified lignins were significantly reduced along with the increase of the proportion of oleic acid, and particularly, the modified lignin 1 greatly improves the convenience of the rubber processing process.

The rubber masterbatch prepared from the modified lignin has the best performance, and the mechanical properties such as tensile strength, stress at a given elongation, and the like are better than those of the rubber masterbatch prepared from carbon black (Comparative Example 2), indicating that a cross-linking network is formed between the modified lignin and the rubber which significantly improves the compatibility and provides the rubber masterbatch with better performance. From the SEM graphs, it can be seen that modified lignins were dispersed in the rubber masterbatch uniformly due to the introduction of oleic acid, while the original lignins significantly aggregated in the rubber masterbatch, resulting in remarkable reductions in mechanical properties.

The natural rubber composite materials prepared in Examples 4 and 5 have similar performance as that of Example 1, with mechanical properties such as tensile strength, stress at a given elongation, and the like superior to those of the rubber masterbatch prepared from carbon black and excellent thermal properties and lower glass transition temperatures, thus greatly improving the thermal stability of the rubber products.

The above examples only illustrate several embodiments of the present invention for the purpose of detailed description, and should not be construed as limiting the scope of the present invention. It should be noted that various modifications and improvements can be made by those of ordinary skill in the art without departing from the spirit of the present invention, and such modifications and improvements shall fall within the scope of the present invention. Therefore, the protection scope of the present invention is determined by the claims.

What is claimed is:

1. A method for preparing a rubber composite material with a lignin-rubber masterbatch, wherein the method comprises preparing the lignin-rubber masterbatch by the following steps:
   (1) reacting a lignin, acetic acid, and oleic acid in the presence of a catalyst to give a modified lignin; and
   (2) blending the modified lignin and a rubber, and granulating to give the lignin-rubber masterbatch;
   in step (1),
   the mass-to-mole ratio of the lignin to the total amount of acetic acid and oleic acid is 1 g:8.2-18.2 mol;
   the molar ratio of acetic acid to oleic acid is 1:0.5-3;
   the catalyst is selected from the group consisting of N,N-dicyclohexylcarbodiimide, 4-dimethylaminopyridine and a combination thereof.

2. The method according to claim 1, comprising:
   (i) mixing the lignin-rubber masterbatch with a rubber to give a rubber compound; and
   (ii) subjecting the rubber compound obtained in step (i) and an additive to mixing, milling, and compression molding to give the rubber composite material.

3. The method according to claim 1, wherein in step (1), the mass-to-mole ratio of the lignin to the total amount of acetic acid and oleic acid is 1 g:10.2-16.2 mol; the molar ratio of acetic acid to oleic acid is 1:1-2.5; the mass-to-mole ratio of the lignin to the catalyst is 1 g:6.7-10.2 mmol.

4. The method according to claim 1, wherein in step (1), the catalyst is a combination of N,N'-dicyclohexylcarbodiimide and 4-dimethylaminopyridine; the molar ratio of N,N'-dicyclohexylcarbodiimide to 4-dimethylaminopyridine is 2-4:1.

5. The method according to claim 1, wherein in step (1), the solvent of the reaction is N,N-dimethylformamide; the mass-to-volume ratio of the lignin to the solvent is 1 g:11-23 mL.

6. The method according to claim 1, wherein in step (1), the temperature of the reaction is 20-30° C.

7. The method according to claim 1, wherein in step (2), the modified lignin accounts for 10%-90% of the total mass of the modified lignin and the rubber.

8. The method according to claim 1, wherein in step (2), the blending is conducted in an open mill or an internal mixer; the temperature of the blending is 60-120° C.

9. The method according to claim 1, wherein the rubber comprises one or more of styrene butadiene rubber, cis-polybutadiene rubber, natural rubber, ethylene propylene rubber, ethylene propylene diene monomer rubber, and butyl rubber.

* * * * *